(12) United States Patent
Tanaka et al.

(10) Patent No.: US 6,636,016 B2
(45) Date of Patent: Oct. 21, 2003

(54) BATTERY PACK AND BACKUP POWER SUPPLY DEVICE UTILIZING THE BATTERY PACK

(75) Inventors: Haruhiko Tanaka, Yachiyo (JP); Yutaka Takata, Takasaki (JP); Masakazu Nakamura, Fussa (JP)

(73) Assignee: Toshiba Battery Co., Ltd., Tokyo (JP)

( * ) Notice: Subject to any disclaimer, the term of this patent is extended or adjusted under 35 U.S.C. 154(b) by 23 days.

(21) Appl. No.: 09/974,903

(22) Filed: Oct. 12, 2001

(65) Prior Publication Data

US 2002/0043959 A1 Apr. 18, 2002

(30) Foreign Application Priority Data

Oct. 16, 2000 (JP) .................................. 2000-315180
Oct. 16, 2000 (JP) .................................. 2000-315181
Oct. 16, 2000 (JP) .................................. 2000-315182

(51) Int. Cl.[7] .................................................. H02J 7/00
(52) U.S. Cl. ..................................................... 320/107
(58) Field of Search ............................... 320/110, 107, 320/112; 429/96, 97, 99, 149, 98; 213/107; 361/679, 686, 688

(56) References Cited

U.S. PATENT DOCUMENTS 5,686,811 A * 11/1997 Bushong et al. .......... 320/110
5,689,654 A * 11/1997 Kikinis et al. ............. 361/686
5,879,831 A *  3/1999 Ovshinsky et al. ......... 429/54
6,255,015 B1 *  7/2001 Corrigan et al. .......... 429/149
6,389,817 B1 *  5/2002 Smith ....................... 62/3.2
6,399,238 B1 *  6/2002 Oweis et al. ............... 429/99
6,485,861 B2 * 11/2002 Takeshita et al. .......... 429/99

* cited by examiner

Primary Examiner—Edward H. Tso
Assistant Examiner—Pia Tibbits
(74) Attorney, Agent, or Firm—Oblon, Spivak, McClelland, Maier & Neustadt, P.C.

(57) ABSTRACT

A battery pack for use as a backup power supply device for various electronic devices has a rechargeable battery group having a plurality of cylindrical rechargeable batteries connected in series and/or parallel and arranged in horizontal flat arrays as a flat block, and an electronic circuit for controlling charging of the rechargeable battery group. Two heat radiating plates sandwich opposite surfaces of the rechargeable batteries of the rechargeable battery group and are held against circumferential surfaces of the rechargeable batteries. A battery case houses an electronic circuit positioned at an end in the direction of the arrays of the rechargeable batteries and surrounds the rechargeable battery group to accommodate them therein. The battery case supports the heat radiating plates so as to be exposed to the exterior. The battery pack is compact and free of thermal problems with the rechargeable batteries.

7 Claims, 9 Drawing Sheets

FIG. 10A  FIG. 10B  FIG. 10C
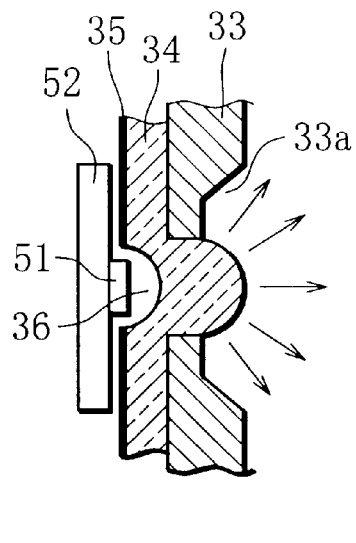
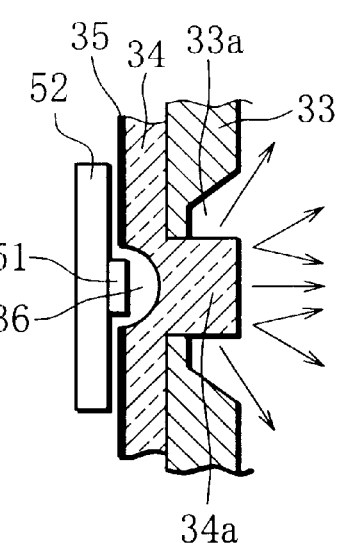
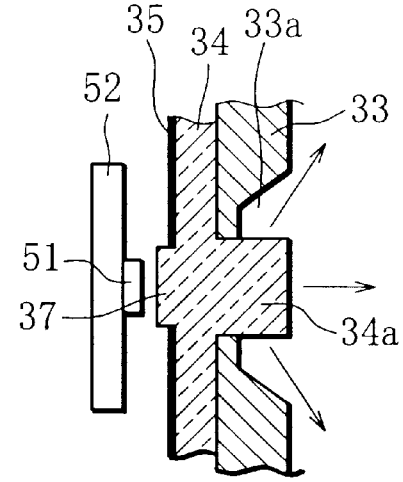
FIG. 11
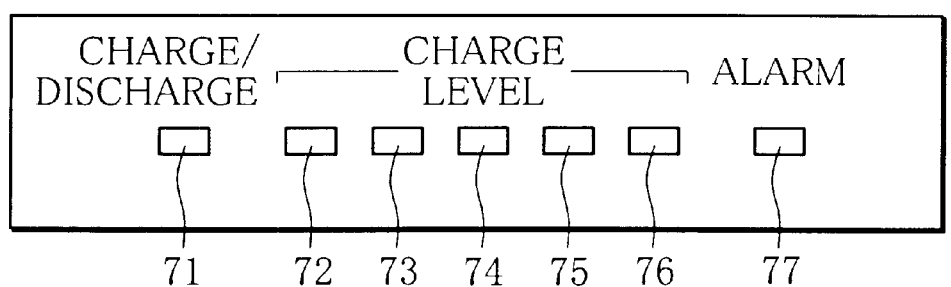

FIG. 13

| CHARGE LEVEL | | DISPLAY | | | | | | |
|---|---|---|---|---|---|---|---|---|
| CHARGE | 0% < Cap ≦ 20% | ■ | ⊠ | □ | □ | □ | □ | □ |
| | 20% < Cap ≦ 40% | ■ | ■ | ⊠ | □ | □ | □ | □ |
| | 40% < Cap ≦ 60% | ■ | ■ | ■ | ⊠ | □ | □ | □ |
| | 60% < Cap ≦ 80% | ■ | ■ | ■ | ■ | ⊠ | □ | □ |
| | 80% < Cap < 100% | ■ | ■ | ■ | ■ | ■ | ⊠ | □ |
| | Cap = 100% | □ | ■ | ■ | ■ | ■ | ■ | □ |
| DISCHARGE | Cap = 100% | □ | ■ | ■ | ■ | ■ | ■ | □ |
| | 80% < Cap < 100% | ▩ | ⊠ | ⊠ | ⊠ | ⊠ | ⊠ | □ |
| | 60% < Cap ≦ 80% | ▩ | ⊠ | ⊠ | ⊠ | ⊠ | □ | □ |
| | 40% < Cap ≦ 60% | ▩ | ⊠ | ⊠ | ⊠ | □ | □ | □ |
| | 20% < Cap ≦ 40% | ▩ | ⊠ | ⊠ | □ | □ | □ | □ |
| | 0% < Cap ≦ 20% | ▩ | ⊠ | □ | □ | □ | □ | □ |

71  72  73  74  75  76  77

□ UNLIT
■ LIT
⊠ BLINK
▩ ■ LIT IN DIFFERENT COLOR FROM
   (THE BLACK RECTANGLE)

BATTERY PACK AND BACKUP POWER SUPPLY DEVICE UTILIZING THE BATTERY PACK

BACKGROUND OF THE INVENTION

1. Field of the Invention

The present invention relates to a battery pack with a compact configuration for use as a drive source or backup power supply device for various electronic devices, and a backup power supply device with such a battery pack.

2. Description of the Prior Art

Attention has been directed to the importance of backup power supplies for supplying electric power to an electronic device, not from its own power supply, to ensure its continued operation in the event of a failure of the device power supply which supplies power to various electronic devices due to a power system fault or power service interruption. Such a kind of backup power supply comprises rechargeable batteries which are charged by the electric power supplied from the device power supply, and, when the device power supply fails to function, discharges and supplies the stored electric energy to the electronic device. Heretofore, as the rechargeable batteries, lead cells having a large capacity have solely been used. Recently, attempts have been made to use nickel-metal hydrid rechargeable batteries or lithium-ion rechargeable batteries.

Rechargeable batteries have their battery characteristics greatly variable depending on the battery temperature. Further, it cannot be denied that rechargeable batteries themselves generate heat when they are charged and discharged. Consequently, any backup power supply devices employing rechargeable batteries require some thermal measures to be incorporated therein. If such a backup power supply device is mounted in a casing which houses an electronic device, then the heat generated by the electronic device may be applied directly to the backup power supply device depending on the location of the backup power supply device in the casing. It is thus necessary to position the backup power supply device in the casing in a layout designed with thermal considerations.

However, the tendency of recent electronic devices which are smaller-sized and are made up of highly packed components may possibly limit significantly the location of the backup power supply device. One solution is to place a backup power supply device in a drive bay that is provided for installing an external unit (auxiliary unit) in a box-shaped casing which houses an electronic device. In this case, however, using the drive bay to accommodate the backup power supply device leaves certain problems unsolved as to how to make the backup power supply device compact enough to be fitted in the drive bay while at the same time combining itself with thermal precautions. Moreover, in general, a hard disk drive is frequently positioned below the drive bay of the casing. Since the hard disk acts as a large heat source, the backup power supply device needs to have an additional thermal protection scheme.

SUMMARY OF THE INVENTION

It is therefore an object of the present invention to provide a battery pack for use as a drive source or backup power supply device for various electronic devices, which is designed to effectively solve problems of heat generated by rechargeable batteries and thermal problems imposed by external sources and also to be compact.

Another object of the present invention to provide a backup power supply device of compact configuration for use in a drive bay of a casing which accommodates an electronic device, for example, therein.

A battery pack according to the present invention has a rechargeable battery group having a plurality of rechargeable batteries connected in series and/or parallel and arranged in horizontal flat arrays as a flat block, an electric circuit for controlling charging of the rechargeable battery group, two heat radiating plates sandwiching opposite surfaces of the rechargeable batteries of the rechargeable battery group, and a battery case supporting the heat radiating plates so as to be exposed, the electronic circuit and the rechargeable battery group being housed in the battery case with the electronic circuit being positioned at an end of the battery case in the direction of the arrays of the rechargeable batteries.

Preferably, the rechargeable batteries comprise cylindrical nickel-metal hydrid rechargeable batteries arranged in two horizontal flat arrays and connected in series. Each of the heat radiating plates has arcuate recesses defined in a surface thereof held against the cylindrical rechargeable batteries and extending along circumferential surfaces of the cylindrical rechargeable batteries. Each of the heat radiating plates has a flat surface exposed out of the battery case. Each of the heat radiating plates has a surface exposed out of the battery case and having a plurality of grooves defined in regions positioned between adjacent ones of the rechargeable batteries arranged in horizontal flat arrays, the grooves extending in the direction of the arrays of the rechargeable batteries, with regions between the grooves serving as heat radiating fins.

The battery pack further includes power supply wires for charging and discharging the rechargeable batteries and signal wires extending from the electronic circuit, the battery case having an end close to the electronic circuit, the power supply wires and the signal wires extending out of the battery case from the end thereof. Further, the electronic circuit desirably has a function to detect a temperature of the rechargeable batteries, and a function to detect a charged energy of the rechargeable batteries, besides its function to control charging of the rechargeable batteries.

According to the present invention, a battery pack of a flat compact shape can be realized and further it has a structure with an excellent heat radiation capability for effectively radiating heat generated by the rechargeable batteries. The battery pack is thus capable of sufficiently performing rechargeable battery functions, and can easily be handled.

A backup power supply device according to the present invention has the battery pack described above, a case for being mounted in a drive bay in a housing which incorporates an electronic device therein, the battery pack being housed in the case. The backup power supply device is arranged to charge the rechargeable batteries of the battery pack with electric energy supplied from a power supply of the electronic device, and supply electric energy from the rechargeable batteries to the electronic device upon a failure of electric energy supplied to the power supply.

In one preferred embodiment of the present invention, the case has a support supporting the battery pack with a gap defined between an inner surface of the case and the heat radiating plates of the battery pack. The support comprises a burr of a predetermined height projecting from a bottom panel of the case into the case, one of the heat radiating plates being fastened to the bottom panel by a screw threaded through the burr into the one of the heat radiating plates.

The backup power supply device further includes a cooling fan disposed in the case at a rear panel thereof for passing air through the case. The case has an air inlet defined in a front bottom panel thereof for introducing air into the case. The cooling fan is energized to discharge air out of the case when the rechargeable batteries are subject to a temperature rise.

According to the backup power supply device with the above-mentioned configuration of the present invention, since air can effectively flows through the case which accommodates the battery pack therein, thermal problems with the battery pack can effectively be solved. The backup power supply device can be handled with ease because it has a compact low profile and is housed in the case that can be mounted in the drive bay in the housing which incorporates the electronic device therein.

The backup power supply device further includes a display unit mounted on a front panel of the case, the display unit comprising a plurality of selectively energizable display elements mounted on a circuit board disposed behind the front panel, and a light guide of a transparent member mounted in the front panel for guiding light emitted from the display elements to a surface of the front panel, the transparent light guide having a light inlet area facing the display elements and a recess or land in the light inlet area for diffusing and introducing the light emitted from the display elements into the transparent light guide.

Preferably, the transparent light guide comprises a panel having an elongate protrusion fitted in a slit extending transversely in the front panel, the panel having a reverse surface confronting the display elements and coated with a light-shielding member except for the light inlet area. The display unit comprises a plurality of display elements for displaying a charged/discharged state of the rechargeable batteries.

According to the backup power supply device having such a display unit, the visual recognition of the display unit is sufficiently enhanced, and an operating state of the backup power supply device can accurately be displayed regardless of the location of the backup power supply device and hence of the location of the housing of the electronic device which incorporates the backup power supply device.

BRIEF DESCRIPTION OF THE DRAWING

FIG. 10A is a fragmentary cross-sectional view of a first structure for the display unit shown in FIG. 9;

FIG. 10B is a fragmentary cross-sectional view of a second structure for the display unit shown in FIG. 9;

FIG. 10C is a fragmentary cross-sectional view of a third structure for the display unit shown in FIG. 9;

FIG. 11 is a front elevational view of a plurality of display elements on the front panel of the backup power supply device shown in FIG. 7;

FIG. 13 is a view showing charged/discharged states of rechargeable batteries and a plurality of charged levels thereof in another pattern which are displayed by the display unit.

DETAILED DESCRIPTION OF THE INVENTION

A battery pack for use as a backup power supply device for electronic devices of one embodiment according to the present invention will be described below with reference to the drawings.

Figure 1:
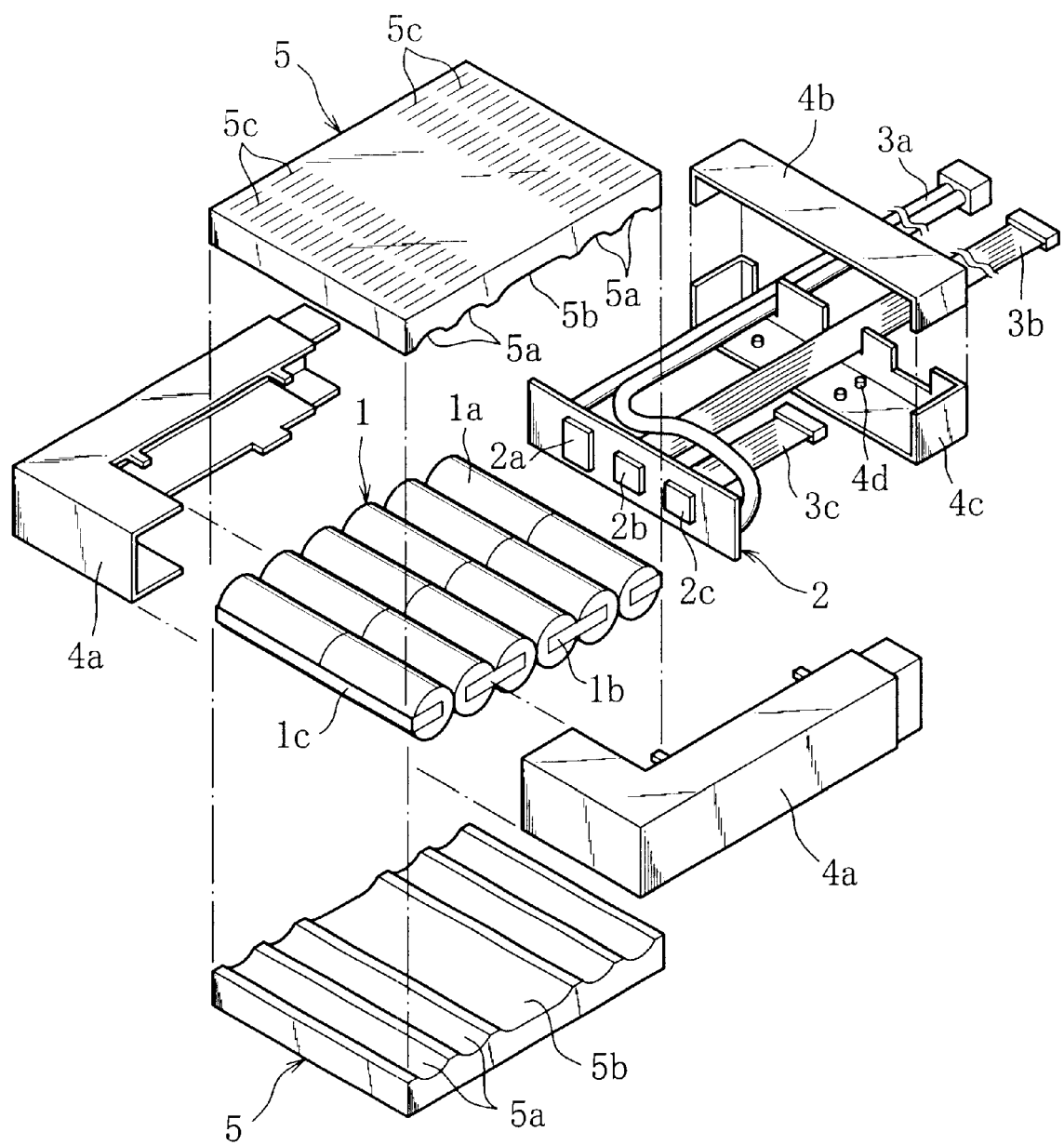
FIG. 1 is an exploded perspective view of a battery pack according to the present invention.

FIG. 1 is an exploded perspective view of a battery pack according to the present invention. As shown in FIG. 1, the battery pack has a rechargeable battery group 1 comprising a plurality of cylindrical rechargeable batteries 1a connected in series and arranged in a horizontal flat planar block.

Specifically, each of the rechargeable batteries 1a comprises an AA-size nickel-metal hydrid rechargeable battery, for example. The rechargeable batteries 1a are oriented or their electrodes are oriented in alternately different directions. The rechargeable batteries 1a are arranged in two horizontal arrays, each having six rechargeable batteries 1a which are connected in series by electrode connectors 1b spot-welded to the electrodes of the rechargeable batteries 1a. The two arrays of rechargeable batteries 1a are oriented in the same direction and juxtaposed in a plane, and connected in series at one end thereof by a long electrode connector 1c whose opposite ends are bent at a right angle. An insulator (not shown) is interposed between the two arrays of rechargeable batteries 1a to prevent a short circuit between confronting electrodes thereof. As a result, the rechargeable battery group 1 is constructed as a flat planar block of series-connected twelve rechargeable batteries 1a arranged in two juxtaposed horizontal arrays each comprising six rechargeable batteries 1a.

A circuit board 2 supports thereon an electronic circuit assembly which is packed together with the rechargeable battery group 1. The electronic circuit assembly mounted on the circuit board 2 comprises a charging control module 2a for controlling the charging of the rechargeable battery group 1, a battery temperature detecting module 2b for detecting the temperature of the rechargeable battery group 1, and a charged energy detecting module 2c for determining a charged energy in the rechargeable battery group 1. The circuit board 2 is disposed in confronting relation to an end of the rechargeable battery group 1 in the form of the flat planar block. The circuit board 2 comprises an elongate rectangular printed-wiring board which is of substantially the same size as the end of the rechargeable battery group 1. Specifically, the circuit board 2 has a shorter side having a length which is essentially the same as the diameter of the rechargeable batteries 1a and a longer side having a length which is essentially the same as twice the length of the rechargeable batteries 1a.

The circuit board 2 is positioned adjacent to the end of the rechargeable battery group 1 and connected to the electrodes of the rechargeable battery group 1. From the circuit board 2, there extend a pair of power supply wires 3a for charging and discharging the rechargeable battery group 1 and signal wires 3b, 3c for outputting signals representing states of the rechargeable battery group 1 which are detected by the electronic circuit assembly on the circuit board 2. The signals representing states of the rechargeable battery group 1 represent information of the battery temperature detected by the battery temperature detecting module 2b, a control signal for operating a cooling fan, described later, depending on the battery temperature, and information of a charged energy in the rechargeable battery group 1 which is detected by the charged quantity detecting module 2c.

The circuit board 2 and the rechargeable battery group 1 are packed together as follows: Basically, the rechargeable battery group 1 and the circuit board 2 are placed in a battery case 4. The battery case 4 of this embodiment has two heat radiating plates 5 vertically sandwiching and held against the upper and lower surfaces of the rechargeable batteries 1a which make up the rechargeable battery group 1 in the form of the flat planar block. The battery case 4 is arranged to support the heat radiating plates 5 that are exposed to the exterior and accommodate the rechargeable battery group 1 and the circuit board 2 therein.

Figure 2:
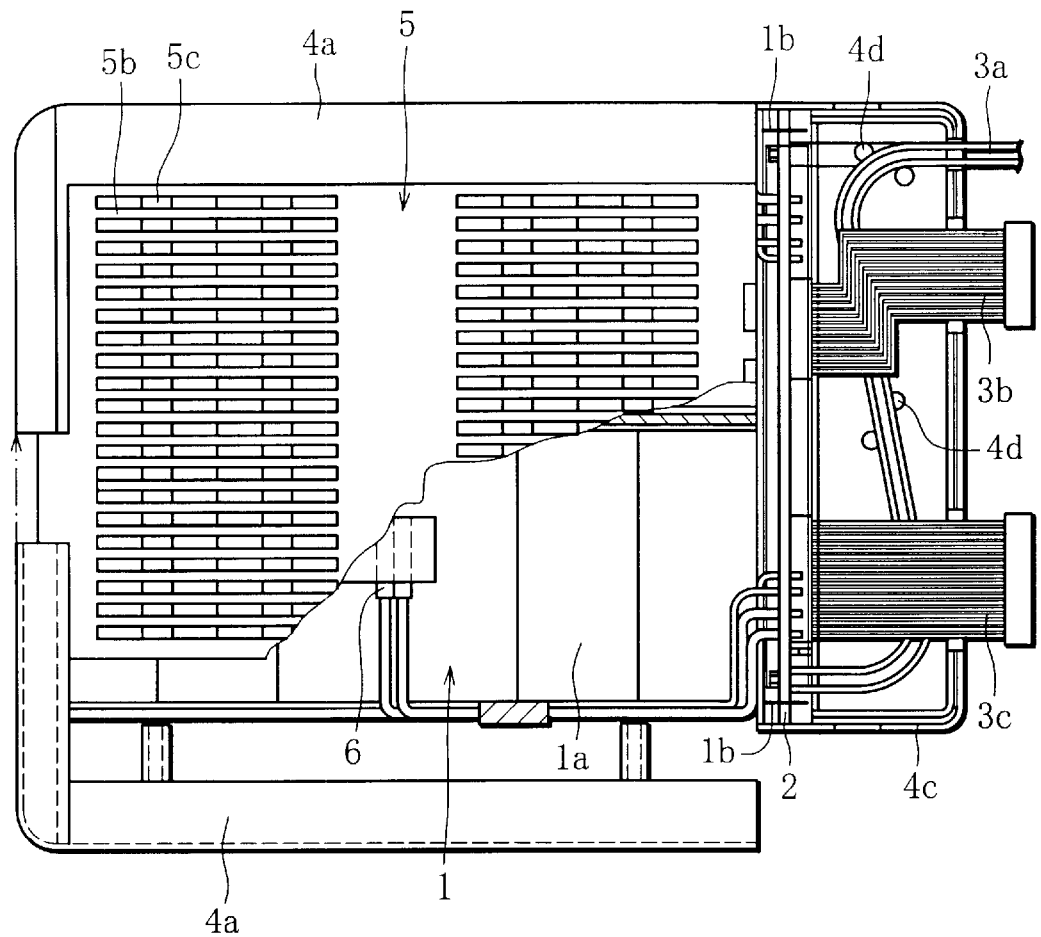
FIG. 2 is a plan view, partly broken away, of the battery pack shown in FIG. 1.
Figure 3:
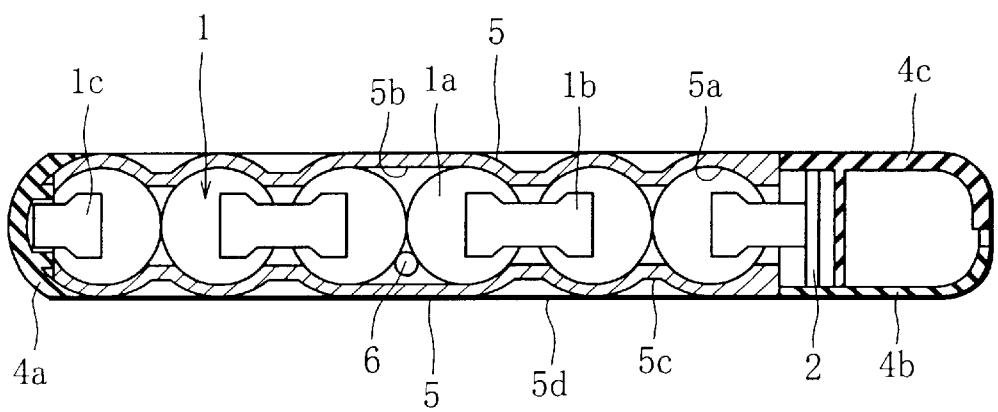
FIG. 3 is a transverse cross-sectional view of the battery pack shown in FIG. 1.

As shown in FIGS. 1 through 3, the heat radiating plates 5 comprise aluminum plates or the like of good thermal conductivity and have recesses 5a, 5b defined in inner surfaces thereof that are held against the rechargeable battery group 1a and having arcuate surfaces along circumferential surfaces of the rechargeable batteries 1a. The heat radiating plates 5 have exposed flat outer surfaces having a plurality of grooves 5c positioned between the recesses 5a, 5b and in thicker regions which are disposed between adjacent ones of the rechargeable batteries 1a that are arrayed horizontally. The grooves 5c extend in the direction of the arrays of the rechargeable batteries 1a. The exposed flat outer surfaces of the heat radiating plates 5 include outer wall ridges disposed between the grooves 5c which serve as heat radiating fins 5d with increased surface areas.

The heat radiating plates 5 have central recesses 5b defined in their inner surfaces which have a width twice the width of the recesses 5a so as to extend over two rechargeable batteries 1a. The wider recesses 5b provide gaps between their flat central bottoms and the circumferential surfaces of the rechargeable batteries 1a, the gaps serving as an installation space for accommodating a temperature sensor 6 that is mounted in a central region of one of the arrays of rechargeable batteries 1a.

The two heat radiating plates 5 sandwich the upper and lower arranged surfaces of the rechargeable batteries 1a which make up the rechargeable battery group 1 and have their inner surfaces held in abutment against the circumferential surfaces of the rechargeable batteries 1a. In this manner, the battery case 4 accommodates therein the rechargeable battery group 1 and the circuit board 2 between the heat radiating plates 5 with their outer surfaces exposed to the exterior.

The battery case 4 also has a pair of L-shaped battery holders 4a fitted over respective opposite sides of the rechargeable battery group 1 and covering peripheral regions including an end and sides of the rechargeable battery group 1, and board holders 4b, 4c positioning the circuit board 2 at the other end of the rechargeable battery group 1 and joined to the battery holders 4a in covering relation to the circuit board 2. The board holders 4b, 4c are vertically separated from each other, and have holes defined therebetween through which the power supply wires 3a and the signal wires 3b, 3c extend from the circuit board 2. The board holders 4b, 4c are integrally united to each other and joined to the battery holders 4a.

As shown in FIGS. 2 and 3 where the battery pack is shown in a plan view, partly broken away and in a transverse cross-sectional view, respectively, the upper and lower heat radiating plates 5 cover the surfaces of the twelve rechargeable batteries 1a arranged in two juxtaposed horizontal arrays in the form of the flat planar block, and have their inner surfaces held in contact with the circumferential surfaces of the rechargeable batteries 1a. Since the outer surfaces of the heat radiating plates 5 are exposed, they can effectively radiate heat generated by the rechargeable batteries 1a. The heat radiating efficiency of the heat radiating plates 5 is high because of the heat radiating fins 5d formed on the outer surfaces of the heat radiating plates 5.

Since the battery pack is in the shape of a flat rectangular parallelepiped in its entirety with the rechargeable battery group 1 whose upper and lower surfaces are covered with the heat radiating plates 5 and whose sides are covered with the battery case 4, the battery pack is of a compact form that can easily be handled. The power supply wires 3a and the signal wires 3b, 3c from the circuit board 2 can also be handled with ease as they extend together through the board holders 4b, 4c.

As shown in FIG. 2, the two power supply wires 3a used to charge and discharge the rechargeable battery group 1 extend from opposite sides of the circuit board 2. One of the power supply wires 3a extends from one side to the other in the battery case 4, and the two power supply wires 3a are put together and extend through the board holders 4b, 4c. Therefore, the power supply wires 3a can also be handled with utmost ease. Each of the power supply wires 3a has a thick core for allowing a large current to pass therethrough. The power supply wires 3a can easily be laid in the battery case 4 because they are guided by bosses 4d projecting in the battery case 4. Accordingly, the power supply wires 3a can be held stably in position under high tensile strength.

Figure 4:
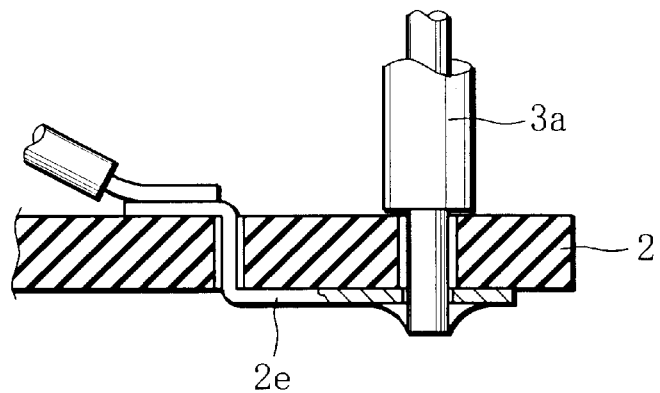
FIG. 4 is a cross-sectional view showing a structure by which a power supply wire of the battery pack shown in FIG. 1 and a circuit board are connected to each other.

Each of the power supply wires 3a is connected to the circuit board 2 by soldering as follows: As shown in FIG. 4, a separate tab 2e is mounted in the circuit board 2, and the power supply wire 3a is extended through a hole in the circuit board 2 and soldered to the tab 2e on the reverse side of the circuit board 2. Since the power supply wire 3a is held by the circuit board 2, the power supply wire 3a can be connected to the tab 2e with increased strength even when the power supply wire 3a is thick and hard, and can be stably soldered even when a large amount of heat is applied in the soldering process.

The battery pack has been described as a flat compact battery pack comprising horizontal arrays of AA-type nickel-hydrogen cells. However, the battery pack may further be constructed into a lower profile by using AAA-type nickel-metal hydrid rechargeable batteries. In such a modification, the battery pack may be of a 1U size that can be incorporated in a standard rack. While in the illustrated embodiment the rechargeable battery group 1 comprises twelve rechargeable batteries 1a connected in series together, the rechargeable battery group 1 may comprise a plurality of rechargeable batteries 1a connected in both series and parallel depending on the battery specification requirements (battery voltage, battery capacity, etc.). The shape of the heat radiating plates 5 and the functions of the electronic circuit may also be changed depending on the battery specification requirements.

Figure 5:
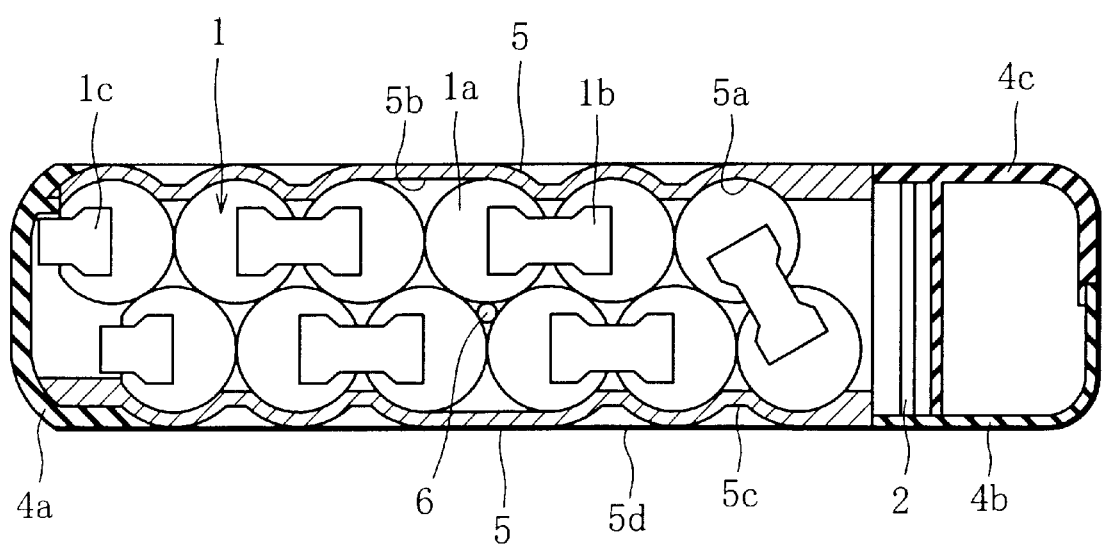
FIG. 5 is a transverse cross-sectional view of a modified battery pack.

FIG. 5 shows a modified battery pack in transverse cross section. As shown in FIG. 5, the modified battery pack has two layers of a horizontal array of rechargeable batteries 1a which are connected in both series and parallel into a rechargeable battery group 1 for an increased battery capacity. Since the circumferential surfaces of each of the rechargeable batteries 1a in the two layers are necessarily held in contact with one of the upper and lower heat radiating plates 5, the heat generated by each of the rechargeable batteries 1a is effectively radiated via the heat radiating plates 5. The rechargeable batteries 1a in one of the two layers are displaced from the rechargeable batteries 1a in the other of the two layers by a distance which is half the pitch between adjacent rechargeable batteries 1a. Consequently, the modified battery pack has a thickness that is smaller than twice the diameter of each of the rechargeable batteries 1a. The battery pack with the two layers of rechargeable batteries 1a has a relatively small thickness and hence is of a relatively low profile.

Figure 6:
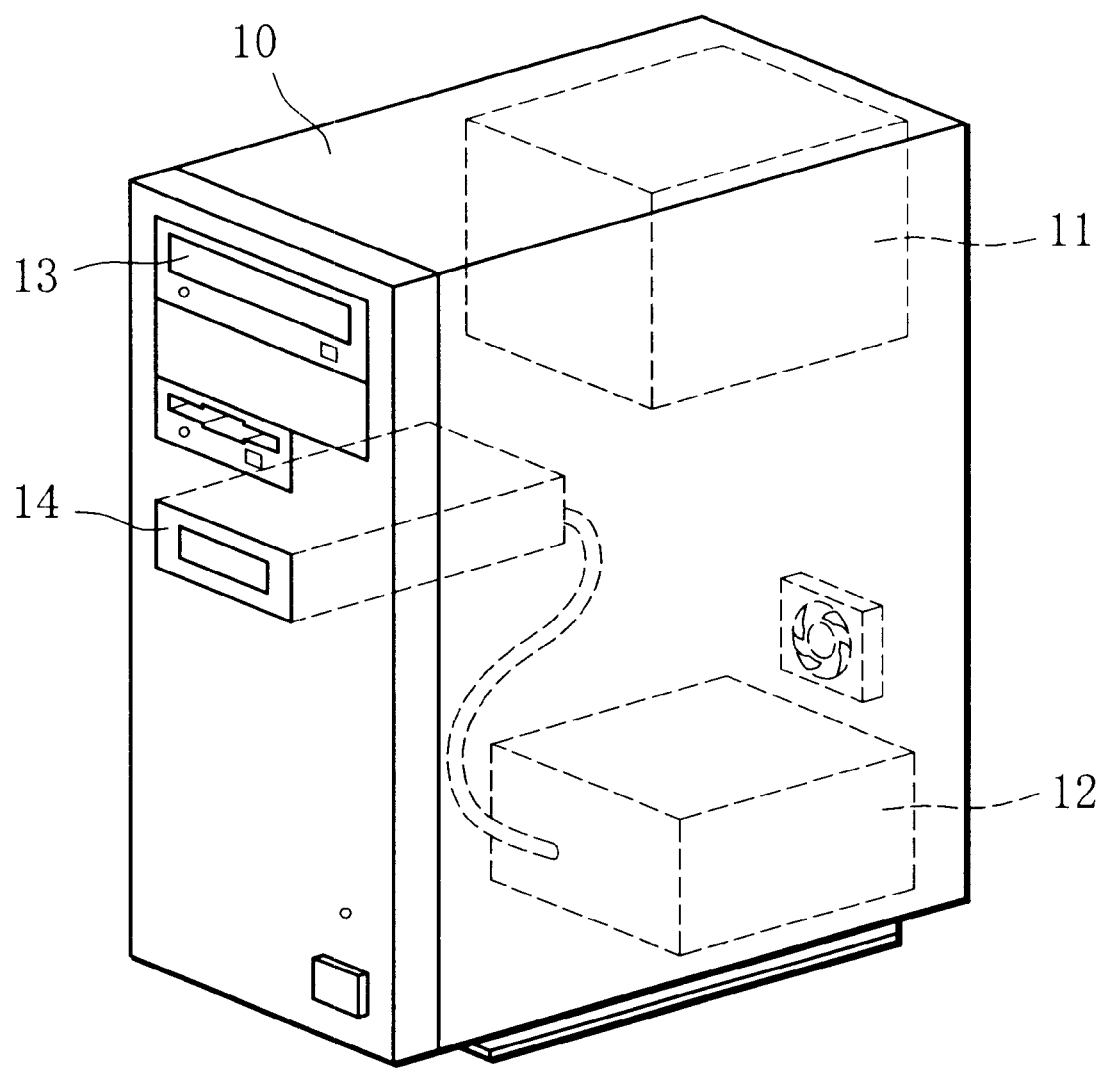
FIG. 6 is a perspective view of an electronic device incorporating a backup power supply device according to the present invention.

As shown in FIG. 6, a computer or server which is an electronic device energized by a commercial power supply as a drive source has a main unit 11 and a power supply 12 which are incorporated in a casing 10 in the form of a mini tower. The housing 10 also accommodates therein a CD drive 13 in a drive bay and a peripheral unit (not shown) such as a hard disk drive or the like.

A backup power supply device for backing up operation of the electronic device supplies electric power to the main unit 11, not from the power supply 12, to ensure its continued operation over a predetermined period of time in the event of a failure of the power supply 12 due to a commercial power system fault or power service interruption. The backup power supply device has rechargeable batteries which are charged by electric power supplied from the power supply 12. When the power supply 12 fails to function, the backup power supply device discharges the electric power stored in the rechargeable batteries via the power supply 12 to the main unit 11.

A backup power supply device 14 (see FIG. 6) according to the present invention comprises a battery pack 20 (see FIG. 7) as the rechargeable batteries referred to above. As shown in FIG. 6, the backup power supply device 14 has a case mounted in a drive bay for 3.5-inch floppy disks in the housing 10, with the battery pack 20 housed in the case.

Figure 7:
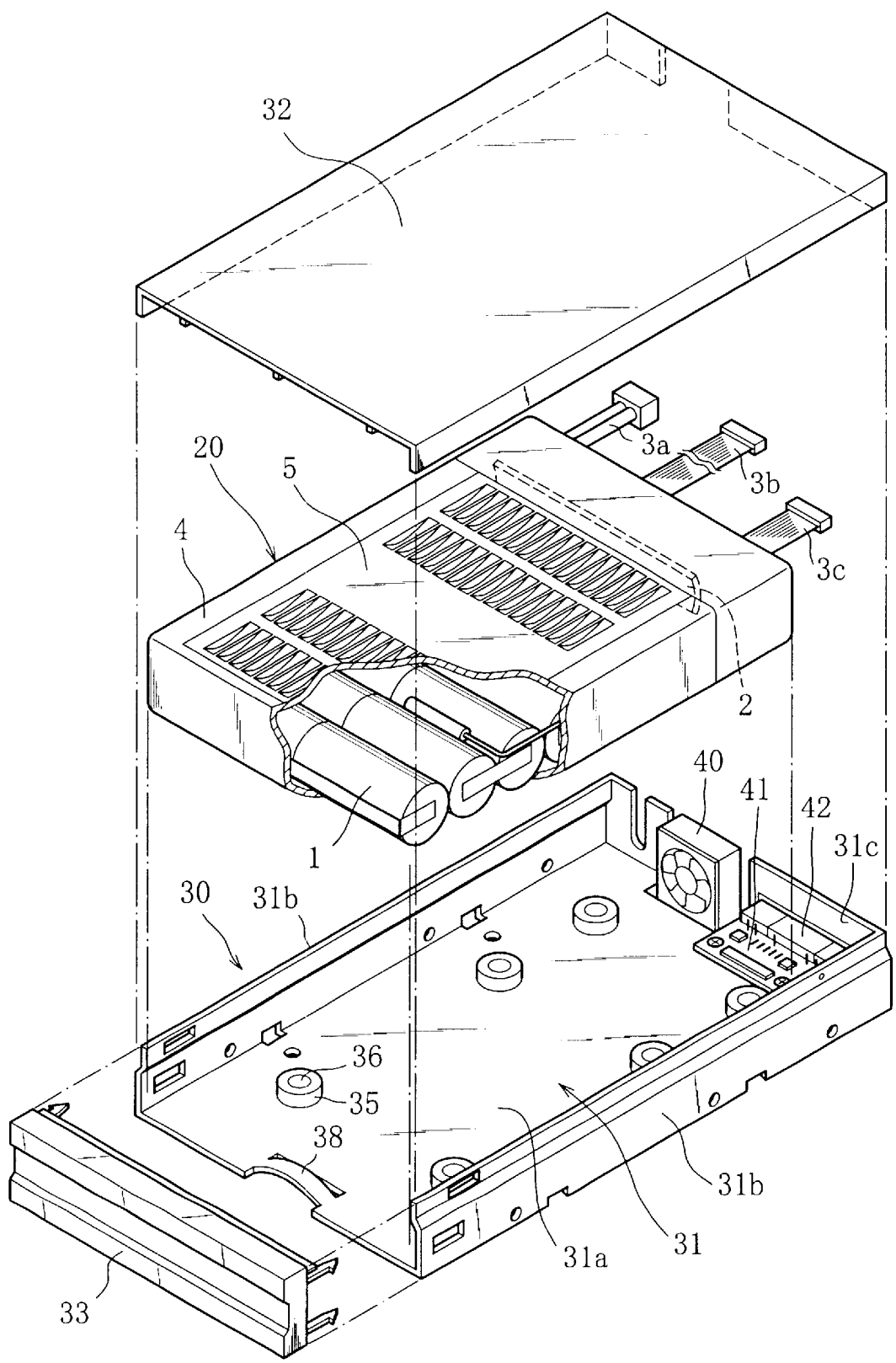
FIG. 7 is an exploded perspective view of a backup power supply device according to the present invention.

As shown in FIG. 7, the battery pack 20 of the backup power supply device 14 comprises a rechargeable battery group 1 having a plurality of series-connected rechargeable batteries as described above and an electronic circuit 2 for controlling the charging and discharging of the rechargeable batteries. The rechargeable battery group 1 and the electronic circuit 2 are accommodated in a battery case 4. The battery pack 20 is in the shape of a flat planar block. The battery pack 20 is housed in a box-shaped case 30 having a size that can be mounted in the drive for 3.5-inch floppy disks.

Figure 8:
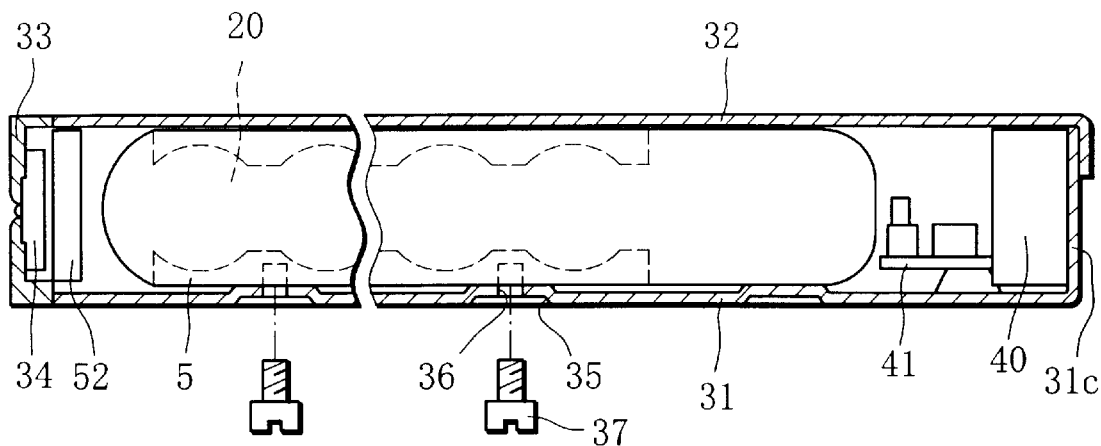
FIG. 8 is a transverse cross-sectional view of the backup power supply device shown in FIG. 7.

As shown in FIGS. 7 and 8, the case 30 comprises a chassis 31 of aluminum having a bottom panel 31a, side panels 31b and a rear panel 31c, a lid 32 as an upper panel covering the chassis 31, and a front panel 33 of plastics mounted on the front end of the chassis 31. The side panels 31b have upper ends stepped inwardly toward each other. The lid 32 has peripheral flanges fitted over the outer sides of the stepped upper ends of the side panels 31b, so that the chassis 31 and the lid 32 are joined to each other with smooth flat outer surfaces on their sides.

The chassis 31 supports thereon a cooling fan 40 positioned near the rear panel 31c for passing air through the case 30. The bottom panel 31a supports on a rear upper surface thereof a circuit board 41 which supports thereon a fan control circuit for controlling operation of the cooling fan 40. A connector 42 for inputting and outputting various control signals is mounted on the circuit board 41 and exposed through an opening defined in the rear panel 31c for connection to external circuits.

The front panel 33 has a plurality of display elements such as light-emitting diodes or the like for displaying operating states of the backup power supply device. A display control circuit board (not shown) for selectively energizing the display elements is supported on the rear surface of the front panel 33. The selective energization of the display elements with the display control circuit board is controlled by information indicative of states of the rechargeable batteries which is given from the battery pack 20. The display elements are selectively energized to display a charged quantity of electric energy (charged energy) in the rechargeable battery group 1, charged/discharged states of the rechargeable battery group 1, and a faulty state thereof.

The backup power supply device with the battery pack 20 housed in the case 30 as described above has the following features: As shown in FIG. 7, the bottom panel 31a of the chassis 31 has a plurality of truncated conical burrs 35 of a given height projecting upwardly into the case 30. The burrs 35 have holes 36 defined respectively in their upper ends.

As shown in FIG. 8, the burrs 35 serve to support the battery pack 20 spaced from the bottom panel 31a by a certain gap. Screws 37 on the reverse side of the bottom panel 31a are inserted through the respective holes 36 in the burrs 35 and threaded into internally threaded holes 5e defined in the lower heat radiating plate 5 of the battery pack 20, thus fastening the battery pack 20 to the bottom panel 31a.

The internally threaded holes 5e are defined in the lower heat radiating plate 5 at given positions, but do not extend through the lower heat radiating plate 5. The burrs 35 are positioned depending on the position where the battery pack 20 is housed, and are aligned with the respective internally threaded holes 5e defined in the lower heat radiating plate 5. The burrs 35 have a height selected such that when the lid 32 is attached in covering relation to the battery pack 20 fixed to the bottom plate 31a, a certain gap is created between the inner surface of the lid 32 and the upper surface of the battery pack 20.

As shown in FIG. 7, a bridge-like projection 38 is formed by partly cutting off a front central end portion of the bottom panel 31a. The projection 38 provides an air passage between itself and the bottom panel 31a, and is held against the front end of the battery pack 20 housed in the chassis 31 thereby positioning the battery pack 20 in place.

Thus, according to the backup power supply device in which the battery pack 20 is housed in the case 30 with the air passage formed by the projection 38, when the cooling fan 40 is energized to draw air from the case 30, fresh external air is introduced through the air passage defined by the projection 38 into the case 30. The introduced air flows through the gap between the lower heat radiating plate 5 and the bottom panel 31a and also through the gap between the upper heat radiating plate 5 and the lid 32, and is then discharged out of the case 30 by the cooling fan 40. As a result, the heat radiating plates 5 are efficiently cooled by the flowing air, and the heat of the battery pack 20 is discharged to reduce a temperature rise of the rechargeable battery group 1. Since the air flows along the heat radiating fins 5d on the outer surfaces of the heat radiating plates 5, the heat radiating effect thereof is increased.

When the backup power supply device is mounted in the drive bay in the housing 10, the air passage defined by the projection 38 is positioned in the space in the housing 10. Therefore, air is supplied from the space in the housing 10 into the case 30 through the air passage, and hence external air laden with dust and dirt particles around the housing 10 is prevented from being directly introduced into the case 30. Consequently, the interior of the backup power supply device is effectively protected against contamination by the external air which carries undesirable contaminants.

Since the chassis 31 of aluminum and the lower heat radiating plate 5 in the form of an aluminum die casting are directly connected to each other by the burrs 35 and the screws 37, heat can be conducted well between the chassis 31 and the heat radiating plate 5. As a result, the chassis 31 itself can function as a heat radiator to provide an increased heat radiating capability for the rechargeable battery group 1. Externally applied heat is absorbed by the heat radiating plates 5 and the chassis 31 that are thermally coupled to each other, so that the rechargeable battery group 1 is prevented from suffering a local temperature rise thereby protecting the rechargeable batteries 1a from unwanted thermal unbalance.

The backup power supply device can effectively function to ensure operation of the electronic device 11 upon a power failure simply by installing the backup power supply device in the drive bay of the housing 10 and connecting the power supply wires 3a to the power supply 12. Therefore, the backup power supply device can be handled with utmost ease. Inasmuch as the backup power supply device is placed in the housing 10 and used with the electronic device 11, the backup power supply device is free of any problems due to the lack of an installation space which would otherwise occur in a large-size no-break power unit incorporating a conventional lead storage battery.

Figure 9:
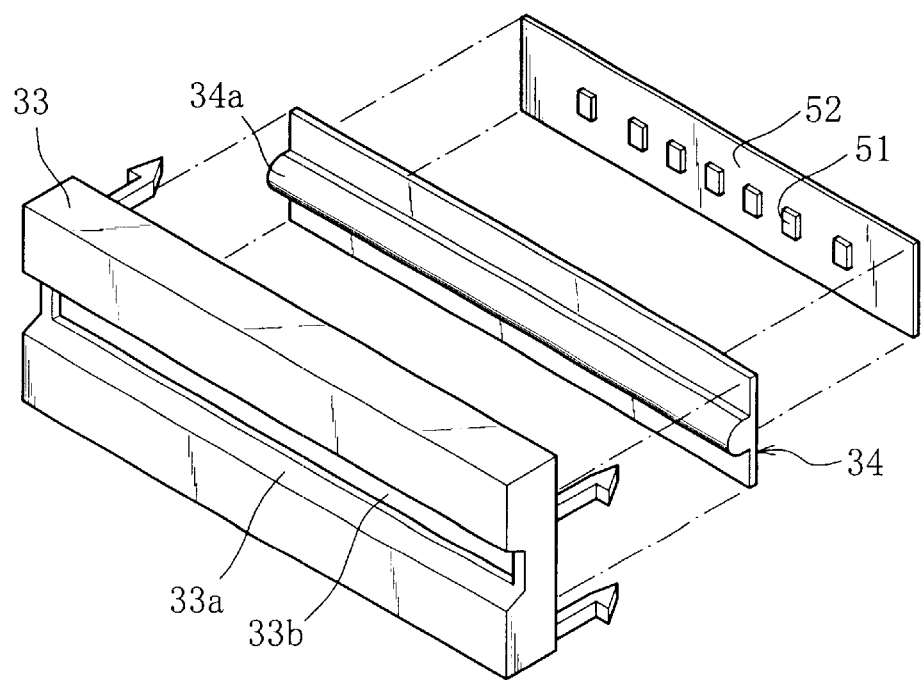
FIG. 9 is a perspective view of a display unit incorporated in a front panel of the backup power supply device shown in FIG. 7.

As shown in FIG. 9, a display unit combined with the front panel 33 of the case 30 comprises a circuit board 52 supporting thereon a plurality of display elements 51 in the form of light-emitting diodes or the like and a display control circuit for selectively energizing the display elements 51. The signal wire 3c extending from the battery pack 20 is connected to the circuit board 52 to supply information representing a charged energy in the rechargeable battery group 1 and other information to the display control circuit. The display control circuit selectively energizes the display elements 51 according to the information given from the battery pack 20 to display a charged energy in the rechargeable battery group 1, charged/discharged states of the rechargeable battery group 1, and a faulty state thereof.

More specifically, as shown in FIG. 9, the front panel 33 has a long horizontal groove 33a defined in its front surface to divide the front surface into upper and lower regions and a slit 33b extending transversely in and along the groove 33a. A transparent panel 34 is mounted on the rear surface of the front panel 33 and has a long horizontal protrusion 34a projecting on a front surface thereof and fitted in the slit 33b. The circuit board 52 with the display elements (light-emitting diodes) 51 and the display control circuit supported thereon is disposed behind the transparent panel 34.

The display elements or light-emitting diodes 51 comprise semiconductor chips mounted directly on the circuit board 52, and are arranged in an array extending along the slit 33b in the front panel 33. The transparent panel 34 functions as a light guide for guiding light emitted from the display elements (light-emitting diodes) 51 to the front surface of the front panel 33. The transparent panel 34 has a rear surface coated with a light-shielding coating layer (light-shielding member) 35 except for an area directly facing the display elements 51. Therefore, the transparent panel 34 guides only light incident on the uncoated area to the front surface of the front panel 33. The transparent panel 34 thus guides only light emitted from the light-emitting diodes 51 from the uncoated area (light inlet area) confronting the light-emitting diodes 51, to the front surface of the front panel 33.

The display unit thus constructed resides in that, as shown FIGS. 10A, 10B, and 10C, the light inlet area of the transparent panel 34 which faces the light-emitting diodes 51 has a recess 36 (see FIGS. 10A and 10B) or a land 37 (see FIG. 10C), and the light emitted from the light-emitting diodes 51 is introduced through the recess 36 or the land 37 and diffused into the transparent panel 34 as the light guide.

The recess 36 has an arcuate surface as shown in FIG. 10A or a parabolic surface as shown in FIG. 10B. The light-emitting diodes 51 have their light-emitting surfaces positioned at the center or focal point of the recess 36. The light emitted in a spreading pattern from the light-emitting diodes 51 is introduced through the curved surface of the recess 36 and diffused into the transparent panel 34. Then, the light is propagated through the transparent panel (light guide) 34, and radiated in a wide spreading angle from the front surface of the transparent panel 34.

The land 37 on the transparent panel 34 as shown in FIG. 10C is positioned such that its distal end is close to the light-emitting surfaces of the light-emitting diodes 51. The light emitted in a spreading pattern from the light-emitting diodes 51 is introduced into the transparent panel 34 while substantially keeping its spreading angle, and propagated through the transparent panel (light guide) 34. The light is then radiated from the front and side surfaces of the transparent panel 34.

With a general conventional display unit structure, only a linear component of light emitted from the light-emitting diodes 51 toward the transparent panel 34 is introduced into the transparent panel 34, and hence the introduced light is radiated from the distal end of the transparent panel 34 only in a front direction.

Since the light emitted from the light-emitting diodes 51 is diffused through the recess 36 or the land 37 into the transparent panel 34, and propagated in various directions through the transparent panel 34, the light radiated from the transparent panel 34 can be visually recognized not only in the front direction of the display unit, but also in directions deviating from the front direction of the display unit.

As a consequence, in the case where the backup power supply device with the display unit is mounted in the drive bay of the housing 1 and the display unit is positioned off the line of sight of the operator, the operator can easily and reliably visually perceive the light radiated from the transparent panel 34. According to the present invention, the visual recognition of the light radiated from the transparent panel 34 is enhanced simply by providing the recess 36 or the land 37 in the light inlet area of the transparent panel 34 which guides the light from the light-emitting diodes 51.

The curvature of the recess 36 or the height of the land 37 may be selected depending on the size of the light-emitting surfaces of the light-emitting diodes 51. The elongate protrusion 34a of the transparent panel 34 may have a flat surface or an appropriately curved surface on its distal end.

The shape of the distal end of the elongate protrusion 34a may be determined depending on the design of the front panel 33. The display elements 51 of the display unit may comprise display elements other than light-emitting diodes, and the number of the display elements 51 is not limited to any numerical value.

According to a preferred embodiment, as shown in FIG. 11, the display unit comprises a light-emitting diode (LED) 71 for displaying a charged energy in the rechargeable battery group 1, five light-emitting diodes 72, 73, 74, 75, 76 for displaying charged/discharged states of the rechargeable battery group 1 in a plurality of levels, and a light-emitting diode 77 for displaying a faulty state of the rechargeable battery group 1. According to the information supplied from the battery pack 20 and representing a charged energy in the rechargeable battery group 1 and other information, the light-emitting diodes 71 through 77 are selectively energized or flickered to display the charged quantity of the rechargeable battery group 1, the charged/discharged states thereof, and the faulty states thereof.

The five light-emitting diodes 72, 73, 74, 75, 76 serve to display the charged energy Cap of the rechargeable battery group 1 in five levels in terms of units of 20% with 100% representing the fully charged state. The light-emitting diode (LED) 71 comprises a light-emitting diode capable of emitting light in two colors, and emits light in one color depending on the charged or discharged state of the rechargeable battery group 1. When the light-emitting diode 71 displays the charged/discharged state of the rechargeable battery group 1 and the light-emitting diodes 72, 73, 74, 75, 76 display the charged quantity of the rechargeable battery group 1, the operator can easily and accurately recognize the state of the rechargeable battery group 1.

Figure 12:
FIG. 12 is a view showing charged/discharged states of rechargeable batteries and a plurality of charged levels thereof which are displayed by the display elements.

Specifically, the seven light-emitting diodes 71 through 77 display the state of the rechargeable battery group 1 in a pattern shown in FIG. 12, for example. The light-emitting diode 71 is energized to emit light in different colors depending on whether the rechargeable battery group 1 is being charged or discharged. For example, when the rechargeable battery group 1 is being charged, the light-emitting diode 71 is energized to emit green light indicating that the rechargeable battery group 1 is being charged. When the charging of the rechargeable battery group 1 is completed, the light-emitting diode 71 is de-energized (the green lighting is stopped). When the rechargeable battery group 1 is being discharged, the light-emitting diode 71 is energized to emit red light indicating that the rechargeable battery group 1 is being discharged.

While the rechargeable battery group 1 is being charged, the light-emitting diodes 72 through 76 are selectively energized depending on the charged energy in the rechargeable battery group 1. Specifically, when the charged energy Cap is 20% or less, only the light-emitting diode 72 is energized. When the charged energy Cap is in excess of 20% and equal to or less than 40%, the two light-emitting diodes 72, 73 are energized for lighting. When the charged energy Cap is in excess of 40% and equal to or less than 60%, the three light-emitting diodes 72, 73, 74 are energized for lighting. When the charged energy Cap is in excess of 60% and equal to or less than 80%, the four light-emitting diodes 72, 73, 74, 75 are energized for lighting. When the charged energy Cap is in excess of 80%, all the five light-emitting diodes 72, 73, 74, 75, 76 are energized for lighting.

When all the five light-emitting diodes 72, 73, 74, 75, 76 are energized for lighting, whether the rechargeable battery group 1 is being charged or the charging thereof is completed is determined based on whether the light-emitting diode 71 indicative of the charged/discharged state is energized or not. While the rechargeable battery group 1 is being discharged, the light-emitting diodes 72 through 76 are also selectively energized depending on the charged energy Cap. At this time, the light-emitting diode 71 indicative of the charged/discharged state is energized in a pattern different from the pattern at the time the rechargeable battery group 1 is being charged, so that the operator can judge when the rechargeable battery group 1 is being discharged from the energized pattern of the light-emitting diode 71.

As described above, while the charged/discharged state of the rechargeable battery group 1 is being displayed by the light-emitting diode 71, the light-emitting diodes 72 through 76 are used to display the charged energy Cap of the rechargeable battery group 1. Therefore, the operator can easily and accurately recognize the state of the rechargeable battery group 1 simply by seeing the energized states (display states) of the light-emitting diodes (display segments) 71 through 76 incorporated in the front panel 33 of the case 30, and hence can confirm whether the backup power supply device or no-break power supply unit is functioning normally. When the light-emitting diode 77 is energized to indicate a faulty state of the rechargeable battery group 1, the operator can reliably recognize such a faulty state of the rechargeable battery group 1 and can take a quick action for recovery.

The backup power supply device does not steadily supply electric energy from the rechargeable batteries to the electronic device 11, but takes over the power supply 12 to supply electric energy from the rechargeable batteries to the electronic device 11 in the event of a fault failing to supply electric energy from the power supply 12 to the electronic device 11. It is thus difficult to confirm whether the charging capability of the backup power supply device is functioning normally simply by displaying the charged quantity of the rechargeable batteries. According to the present invention, since the backup power supply device has the display segment (light-emitting diode 71) for displaying the charged/discharged state, the operator can immediately know when the rechargeable batteries start being charged from the energization of the light-emitting diode 71 at the time the backup power supply device is accommodated in the housing 10. The operator can therefore easily and accurately confirm the charging capability of the backup power supply device. After the charging of the rechargeable batteries is completed, the light-emitting diode 71 is de-energized, allowing the operator to know that the rechargeable batteries are not in the charged/discharged state. Since the light-emitting diodes 72 through 76 are all energized, they indicate that the rechargeable batteries are in a standby state capable of backing up the electronic device 11. Thus, the operator can reliably know that the rechargeable batteries are functioning properly.

The light-emitting diodes 72 through 76 for displaying the charged quantity in a plurality of levels may be energized in different patterns when the rechargeable batteries are charged and discharged, as shown in FIG. 13. Specifically, while the rechargeable batteries are being discharged, the light-emitting diodes 72 through 76 are flickered depending on the battery energy (charged quantity) Cap, clearly indicating that the rechargeable batteries are being discharged. At this time, the display segment (light-emitting diode 71) dedicated to the display of the charged/discharged state of the rechargeable batteries indicates that the rechargeable batteries are being discharged. Accordingly, the operator does not overlook the display pattern of the flickering light-emitting diodes 72 through 76.

As shown in FIG. 12, while the rechargeable batteries are being charged, those light-emitting diodes which correspond to already charged levels may be energized, and the light-emitting diode which corresponds to a presently charged level may be flickered to display the charged energy Cap. In other words, only the light-emitting diode which corresponds to the level of the charged energy Cap may be flickered, and those light-emitting diodes which correspond to the levels lower than the presently charged level may be continuously energized. This display pattern allows the operator to distinguish the already achieved charged quantity and the presently charged quantity from each other, so that the operator can recognize the charged energy Cap more accurately.

The battery pack which is of a flat compact shape and can easily be handled according to the present invention, offers various practical advantages.

Although certain preferred embodiments of the present invention has been shown and described in detail, it should be understood that various changes and modifications may be made therein without departing from the scope of the appended claims.

What is claimed is:

1. A battery pack comprising:
   a rechargeable battery group having a plurality of rechargeable batteries connected in series and/or parallel and arranged in horizontal flat arrays as a flat block;
   an electronic circuit for controlling charging of said rechargeable battery group;
   two heat radiating plates sandwiching both array surfaces of the rechargeable battery group; and
   a battery casing supporting said heat radiating plates so as not to cover all of the heat radiating plates, said electronic circuit and said rechargeable battery group being housed in said battery casing.

2. The battery pack according to claim 1, wherein said rechargeable battery group comprises one or more layers of said rechargeable batteries arranged in the horizontal flat arrays.

3. The battery pack according to claim 1, wherein said rechargeable batteries comprise cylindrical nickel-metal hydride rechargeable batteries arranged in two horizontal flat arrays and connected in series and/or parallel.

4. The battery pack according to claim 1, wherein said rechargeable batteries comprise cylindrical rechargeable batteries, each of said heat radiating plates having accurate recesses defined in a surface thereof held against said cylindrical rechargeable batteries and extending along circumferential surfaces of the cylindrical rechargeable batteries, each of said heat radiating plates having a flat surface that is not covered with said battery casing.

5. The battery pack according to claim 4, wherein each of said heat radiating plates has a surface that is not covered with said battery casing, said surface having a plurality of grooves defined in regions positioned between adjacent ones of the rechargeable batteries arranged in horizontal flat arrays, said grooves extending in the direction of the arrays of the rechargeable batteries.

6. The battery pack according to claim 1, further comprising power supply wires for charging and discharging said rechargeable batteries and signal wires extending from said electronic circuit, said battery casing having said electronic circuit at an end of the horizontal flat arrays of the group.

7. The battery pack according to claim 1, wherein said electronic circuit has a function to control charging of said rechargeable battery group, a function to detect a temperature of said rechargeable batteries, and a function to detect a charged energy of said rechargeable batteries.

* * * * *